March 15, 1966 — J. A. POLITO — 3,239,876
SCALLOP EVISCERATOR
Original Filed March 6, 1961
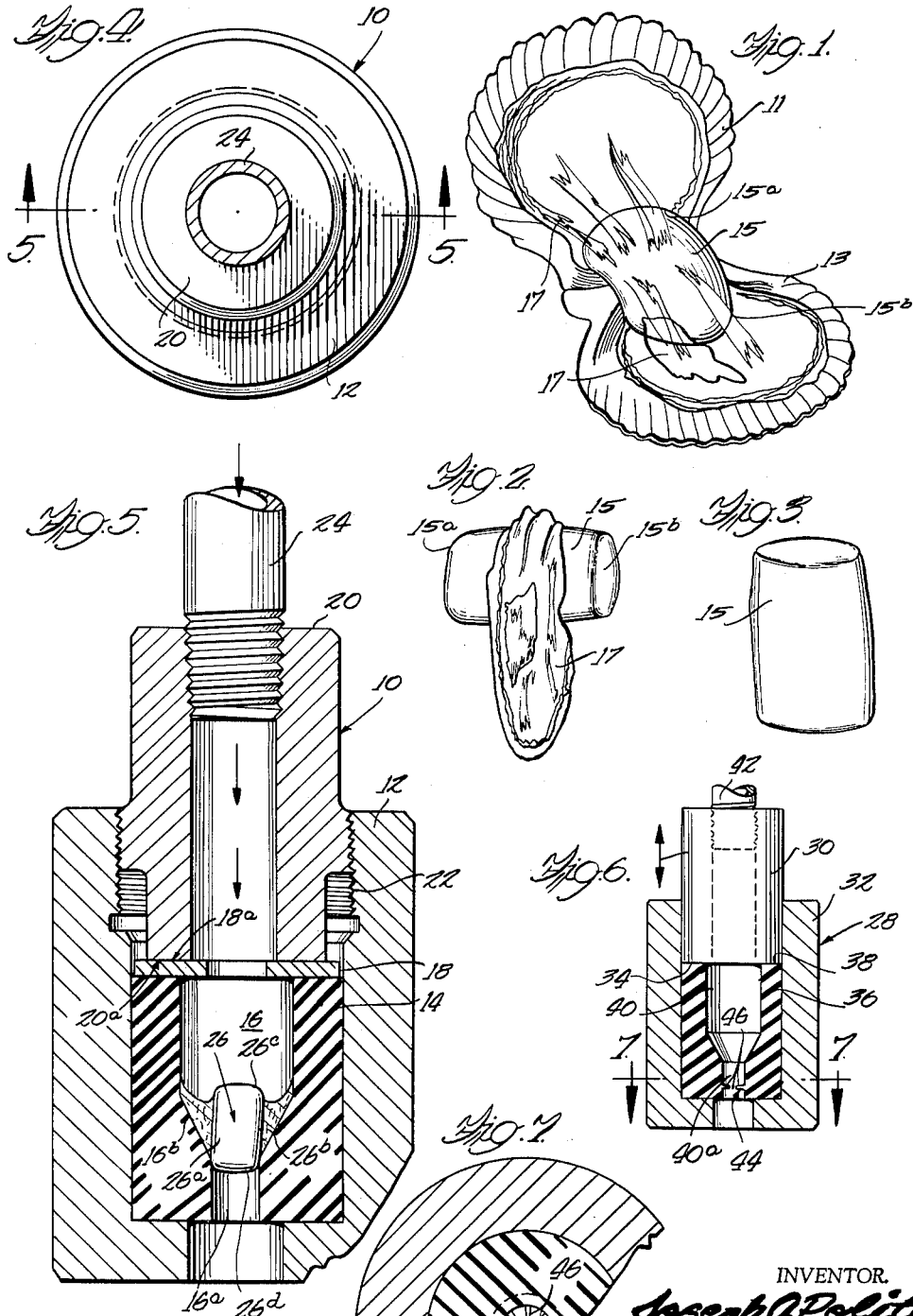
INVENTOR.
Joseph A. Polito
By Pendleton, Neuman,
Seibold & Williams
Attorneys

United States Patent Office 3,239,876
Patented Mar. 15, 1966

3,239,876
SCALLOP EVISCERATOR
Joseph A. Polito, Maywood, Ill., assignor to Continental Seafood Corporation, Chicago, Ill., a corporation of Illinois
Original application Mar. 6, 1961, Ser. No. 93,406, now Patent No. 3,156,948, dated Nov. 17, 1964. Divided and this application Sept. 29, 1964, Ser. No. 413,666
9 Claims. (Cl. 17—2)

This application is a division of my copending prior application Serial No. 93,406, filed March 6, 1961, entitled Scallop Eviscerator, now Patent No. 3,156,948.

This invention relates to an apparatus for scallop evisceration, and more particularly, to an apparatus for mechanically separating the viscera from the meat of a shucked scallop.

Scallops are marine mollusks, as are oysters and clams. They consist of three major parts: two shells or valves; viscera (sometimes called the "rim"); and a single large adductor muscle (also called the "meat" or "eye" of the scallop), which is the edible part of the scallop, marketed for consumption in the United States.

Scallops have heretofore been cleaned and prepared for marketing by hand-shucking techniques. One such technique comprises opening the scallop from the back at the hinge of the two valves with a knife or similar instrument, inserting the knife between the meat and one valve so that the viscera is pinched to the inner surface of that valve, and separating the valves. The separation of the valves will pull the viscera away from the meat, leaving the meat attached to the second valve from which it may be easily cut. This process of separating the meat of the scallop from the viscera is beset with several drawbacks. For example, it is a slow process and is thus impractical for cleaning certain smaller species of scallops, such as calico scallops, which provide only four to five pints of meat per bushel of shell stock. Moreover, in such species of scallops as calico scallops, there is greater exterior curvature of the valves and thus greater interior concavity, making it difficult to cut the muscle from the valves without at least some meat loss, such loss being as high as 20 percent in some instances. Because of the aforementioned disadvantages of the prior art processes, calico scallops and the like are not to any great extent marketed in the United States, notwithstanding that they are plentiful and quite palatable.

Accordingly, it is one object of this invention to provide an apparatus for economically eviscerating scallop meat for commercial use and sale with a negligible amount of waste.

It is a further object of this invention to provide an apparatus for economically eviscerating and making commercially feasible low yielding and structurally peculiar scallops, such as calico scallops.

Further and additional objects will be apparent from the drawings, descriptions, and claims.

The present invention contemplates that the preparation for marketing of scallop meat will comprise two distinct operations: (1) shucking the scallop; that is to say, separating the shells or valves from the tissue, and (2) eviscerating the scallop tissue; namely, separating the viscera from the meat or muscle. The first step may be carried out by any conventional means presently used, for example, for shucking oysters or clams, and no particular shucking process forms a part of the present invention. The apparatus of this invention relates solely to the step of separating the viscera from the muscle of the scallop tissue after the tissue has been removed from the shells.

The apparatus of the present invention comprises, generally, a supporting member having an axial restricted passageway formed therein which is adapted to receive scallop meat with attached viscera after the meat and viscera have been removed from the valves. The meat is disposed in the supporting member intermediate its ends, and fluid is introduced into the passageway. The fluid exerts pressure on one end of the meat and forces it through the restricted passageway, causing the meat to separate from the viscera in the direction of the other end of the meat. The supporting member is generally constructed of a resilient or elastic material such as rubber or an elastomer so as to prevent damage to the scallop meat and to permit adjustment of the member for various sized scallop meats. It may be brought into frictional engagement with the meat contained therein by the application of an axial force thereon which causes the passageway in the supporting element to contract. The fluid used to exert pressure on the scallop meat is preferably water, since, among other things, it is both economical to use and will not contaminate the meat.

Drawings have been provided to facilitate understanding of the invention as follows:

FIG. 1 shows a scallop after the shell or valves have been separated but prior to the removal of the adductor muscle and viscera from the valves.

FIG. 2 shows scallop tissue after it has been removed from the valves, but prior to the separation of the viscera from the muscle.

FIG. 3 shows the muscle or meat of a scallop after it has been removed from the valves and the viscera.

FIG. 4 is a top plan view of one embodiment of this invention.

FIG. 5 is a cross-sectional view of the embodiment of FIG. 4 taken along line 5—5 thereof and shows a scallop therein prior to its being eviscerated.

FIG. 6 is a modification of the embodiment of FIG. 4.

FIG. 7 is a partial cross-sectional view taken along line 7—7 of FIG. 6.

Referring now to the drawings, and particularly to FIGS. 1 to 3, it can be seen that a scallop has been provided in various stages of dissection. FIG. 1 shows a whole scallop after it has been opened. It comprises two valves, 11 and 13, the muscle or the meat 15, and the viscera 17. FIG. 2 shows the muscle 15 with the viscera 17 attached thereto after they have been removed from the valves 11 and 13 of the scallop shown in FIG. 1. As can be seen from this drawing, the viscera 17 is attached to the meat 15 intermediate the ends, 15a and 15b, thereof, the ends of the meat 15 being free of viscera. Muscle 15 is shown in FIG. 3 in its marketable form after it has been removed from the valves 11 and 13 and from the viscera 17.

Reference is now made to FIGS. 4 and 5, which show one embodiment of the apparatus of this invention. The eviscerator 10 comprises a substantially cylindrical unit 12 which houses a resilient supporting member 14 provided with an axial passageway 16 for receiving scallop tissue or product 26. The passageway 16 has a substantially cylindrical configuration with a restricted portion 16a and conic surfaces 16b therein. The conic surfaces aid in separating the viscera from the meat, and also help guide the product into the restricted orifice with one of the ends of the meat as the leading surface, so that less care is required in the placement of the scallop product in the eviscerator. Where desired, however, a configuration other than conical may be formed in the passageway 16 to perform the same function as the latter.

An annular metal washer 18 is provided coincident to the supporting member 14 and immediately adjacent thereto. Pressure member 20 is threadably connected to unit 12 by screw threads 22 provided in the latter unit, and has a rigid annular surface 20a which may be brought to bear on one surface 18a of washer 18. By tightening member 20, pressure is exerted against the washer surface 18a and this pressure is transmitted to supporting member 14 in the form of an axial force. The passageway 16 in member 14 thereby contracts and grips the scallop meat and viscera disposed therein, intermediate the ends of the meat. Liquid or fluid inlet 24, which may be a metal pipe, rubber tube or the like, and which is connected to member 20, injects fluid through member 20 and the annulus of the surface 20a thereof and into the passageway 16 of supporting member 14. The fluid applies pressure to one end 26c of the meat 26a of the scallop product 26 forcing the latter through passageway 16 in the direction of the other end 26d of the meat. The product 26, with end 26d as the leading edge, is guided by conic surfaces 16b into the restricted orifice 16a. The viscera 26b will adhere to the walls of the passageway 16 and thereby separate from the meat 26a. Both the meat and viscera will ultimately be discharged from the eviscerator, the meat preceding the viscera. The fluid preferably used in the illustrated embodiment is water.

FIG. 6 shows a modification 28 of the embodiment of FIG. 4. In this embodiment it will be seen that pressure member 30, although it performs the same function as pressure member 20 of the apparatus of FIG. 4, operates similar to a piston. Pressure member 30 slidably engages substantially cylindrical housing 32 and has a rigid annular surface 34. By actuating member 30, the surface 34 thereof may be brought to bear on resilient supporting member 36 and to exert pressure against the surface 38 of the latter member 36. Member 30 may be actuated in many conventional ways. For example, a mechanical linkage may be employed to move piston 30 downwardly against resilient member 36, or the same fluid pressure which forces the scallop product through the eviscerator may be employed to first actuate the piston 30. Similar to the supporting member 14 of the embodiment of FIG. 5, member 36 has an axial passageway 40 formed therein for receiving the uneviscerated scallop meat. The application of pressure on member 36 will cause the passageway 40 to contract and to frictionally engage the product therein. Water or other fluid is then introduced into eviscerator 28 through fluid inlet 42, forcing the scallop meat through the passageway 40 and restricted orifice 40a, thereby effecting separation of the meat from the viscera in the same manner as when the apparatus of FIG. 5 is employed.

FIG. 6 also shows the use of scraping means 44 located in the restricted orifice 40a of passageway 40 of supporting member 36. The scraping means 44 in the present embodiment comprise small resilient protuberances or fingers 46, best shown in FIG. 7. They may be formed from the same material used to construct the supporting member, namely, rubber or other elastomeric or resilient substances. The protuberances 46 engage the viscera as the scallop meat is forced through the orifice 40a and aid in the separation of the viscera from the scallop meat.

The disclosed embodiments are only for illustrative purposes, and many variations will immediately appear to the artisan. In commercial production, for example, the instant invention would be incorporated into an automatic or semi-automatic machine which would facilitate the timed insertion of the scallop product, the closure of the eviscerator, and the application of fluid pressure.

Further modifications will be apparent to those skilled in the art, and it is contemplated, therefore, by the appended claims to cover any such modifications as fall within the true spirit and scope of this invention.

I claim:

1. Apparatus for cleaning scallop meat having viscera attached to it intermediate its ends, which ends were attached to the scallop valves, comprising means for frictionally engaging the meat and attached viscera, means for applying fluid pressure to one end of said meat, and a restricted passageway through which the meat is forced by said pressure, whereby the meat is separated from said viscera in the direction of the other end of said meat.

2. Apparatus for cleaning scallop meat having viscera attached to it intermediate its ends, which ends were attached to the scallop valves, comprising resilient means for frictionally engaging the meat and viscera intermediate the ends of the meat; said means having an axial restricted passageway therein adapted to receive the meat and attached viscera; and means for applying fluid pressure to one end of said meat whereby the meat is separated from the viscera in the direction of the other end of said meat.

3. Apparatus for cleaning scallop meat having viscera attached to it intermediate its ends, which ends were attached to the scallop valves, comprising a resilient member having an axial restricted passageway formed therein adapted to receive the meat and attached viscera; means for applying axial pressure to said resilient member whereby the passageway therein is contracted and brought in frictional engagement with the meat and viscera intermediate the ends of the meat; means for applying fluid pressure to one end of said meat whereby the meat is separated from said viscera in the direction of the other end of the meat.

4. Apparatus for cleaning scallop meat having viscera attached to its intermediate its ends, which ends were attached to the scallop valves, comprising a housing; a resilient member disposed in said housing, said resilient member having an axial restricted passageway formed therein adapted to receive the meat and attached viscera; means defining a rigid annular surface for applying pressure axially to said resilient member whereby said passageway therein is contracted and brought into frictional engagement with the meat and viscera intermediate the ends of the meat; means for applying fluid through said pressure means and into said passageway so as to apply pressure to one end of said meat whereby the meat is separated from the viscera in the direction of the other end of the meat.

5. Apparatus for cleaning scallop meat having viscera attached to it intermediate its ends, which ends were attached to the scallop valves, comprising a generally cylindrical housing; a resilient member disposed in said housing, said resilient member having an axial passageway formed therein adapted to receive the meat and attached viscera, said passageway having conic surfaces and a restricted orifice therein; generally cylindrical pressure means defining a rigid annular surface for applying pressure axially to said resilient member whereby the passageway formed therein is contracted and brought into frictional engagement with the meat and viscera intermediate the ends of the meat, means for injecting fluid through said pressure means and into said passageway of said resilient member, said fluid applying pressure to one end of said meat whereby the other end of said meat is guided by the conic surfaces into said restricted orifice and the meat is separated from the viscera in the direction of said other end of said meat; and scraping means disposed in said restricted orifice for assisting the separation of the meat from the viscera.

6. The apparatus of claim 5 wherein the scraping means comprise a plurality of protuberances disposed in the orifice formed in said resilient member and attached to the inner surface thereof.

7. The apparatus of claim 5 wherein said fluid is a liquid.

8. The apparatus of claim 5 wherein said fluid is water.

9. Apparatus for cleaning scallop meat having viscera attached to its intermediate its ends, which ends were attached to the scallop valves, comprising a substantially cylindrical housing; a rubber member disposed in said housing, said rubber member having an axial, generally cylindrical passageway formed therein adapted to receive the meat and attached viscera, said passageway having conic surfaces and a restricted orifice therein; generally cylindrical pressure means engaging said housing, said means defining a rigid annular surface for applying pressure axially to said rubber member whereby the passageway formed therein is contracted and brought into frictional engagement with the meat and viscera intermediate the ends of the meat; water inlet means for injecting water through the pressure means and into said rubber member passageway, said water applying pressure to one end of said meat, whereby the other end is guided by said conic surfaces into said restricted orifice and the meat is separated from the viscera in the direction of said other end of said meat and is discharged from said apparatus prior to the discharge of said viscera.

References Cited by the Examiner
UNITED STATES PATENTS

| | | | |
|---|---|---|---|
| 2,164,384 | 7/1939 | Carpentieri | 146—43 |
| 3,129,456 | 4/1964 | Renfroe | 17—45 |

SAMUEL KOREN, *Primary Examiner.*

LUCIE H. LAUDENSLAGER, *Examiner.*